March 15, 1960   J. A. KRAPF   2,928,380
PRESSURE CENTERED CONTROL VALVE
Filed Dec. 4, 1957
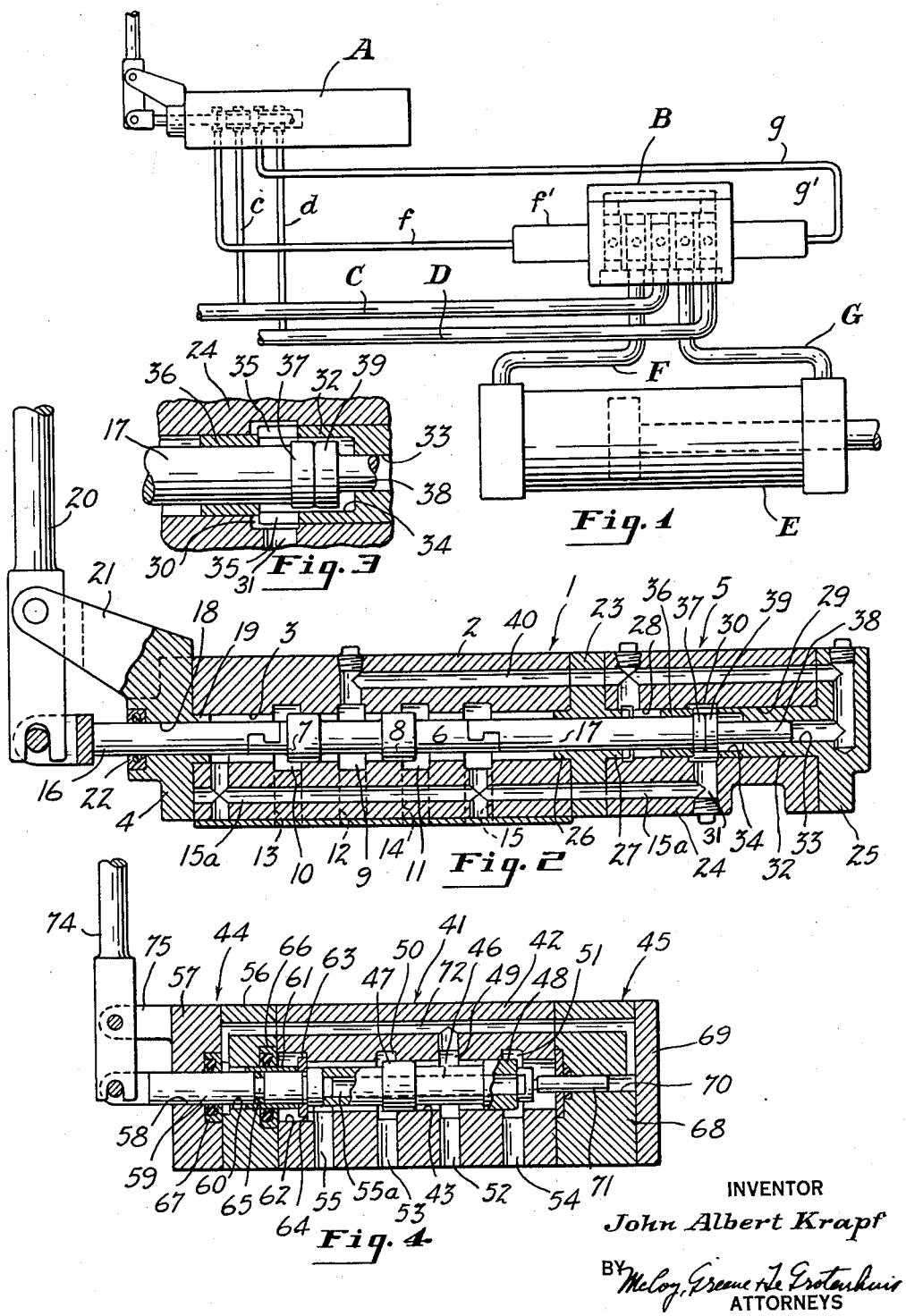
INVENTOR
John Albert Krapf
BY McCoy, Greene & Te Groterhuis
ATTORNEYS

United States Patent Office 2,928,380
Patented Mar. 15, 1960

2,928,380

PRESSURE CENTERED CONTROL VALVE

John Albert Krapf, Cleveland Heights, Ohio, assignor to Gerlando Tuttolomondo, Cleveland, Ohio Application December 4, 1957, Serial No. 700,595

4 Claims. (Cl. 121—46.5)

This invention relates to valves for directing flow of fluid in a fluid pressure system and more particularly to valves of the type that are movable in either direction from an intermediate position to direct the flow of fluid under pressure from a pressure line through the valve, this application being a continuation-in-part of my copending application Serial No. 247,340, filed September 19, 1951 upon which Patent No. 2,826,178 was granted March 11, 1958.

The valve of the present invention is of the automatically centering type, being provided with centering cylinders that are connected at all times to the pressure line and that have pistons that apply opposing thrusts to the valve and with actuating means for moving the valve in either direction from its neutral position in opposition to the line pressure acting upon one of said cylinders. The force required to shift the valve from its intermediate or neutral position is always proportional to the line pressure so that the valve may provide means in addition to the usual gauges for indicating undesirable changes in line pressure.

One of the centering pistons is preferably provided with a pressure face area greater than the other and a stop is provided in the path of this piston that limits the valve actuating stroke thereof and that is positioned to stop the same at a point where the valve member has reached its intermediate or neutral position so that the valve is normally held by the pistons in said intermediate or neutral position.

The valve is preferably of the sliding piston type with an end portion projecting through an end of the valve casing for connection to external operating means and, to simplify the valve structure, one of the centering pistons is preferably of the sleeve type and slidably mounted upon an end portion of the valve member.

The invention has for important objects to provide a rugged and durable valve suitable for high pressure hydraulic systems, to provide a simple and compact construction for a pressure centered valve of the sliding piston type which has a portion extending through an end of the valve casing for connection to external actuating means, and to provide a manually operated pressure centered control valve that requires a force proportional to existing line pressure to move it in either direction from its intermediate or neutral position so as to indicate to the operator undesirable or dangerous variations in line pressure.

Reference should be had to the accompanying drawings forming a part of this specification in which:

Figure 1 is a diagrammatic view showing the valve of the present invention employed as a pilot valve in a hydraulic system;

Fig. 2 is a longitudinal section through the control valve of the present invention showing the same in its neutral position;

Fig. 3 is a fragmentary longitudinal section on an enlarged scale showing the pressure centering pistons in positions where the valve is shifted from its intermediate or neutral position against the pressure in one of the valve centering cylinders; and Fig. 4 is a longitudinal section through a control valve of modified construction.

The present invention is applicable in general to valves of the type which are movable in either direction from an intermediate or neutral position to direct flow of fluid.

In Fig. 1 of the drawings, a control valve embodying the present invention, which is indicated by the reference character A, controls the operation of a main valve B which serves to connect a hydraulic pressure line C or a drain line D to service conduits F and G extending from the valve B to a hydraulic motor E which is herein shown as a cylinder and piston. The valve B, as more fully explained in my copending application above referred to, is movable from an intermediate or neutral position in one direction or the other to connect one of the conduits F or G to the pressure line C and simultaneously connect the other of said conduits to the drain line D. The control valve A is connected to the pressure and drain lines C and D through conduits c and d and is connected through service conduits f and g with actuating cylinders f' and g' for shifting the main valve B. The control valve A serves to apply pressure to the cylinder g' through the conduit g and to simultaneously connect the cylinder f', through the conduit f, to the drain line D to actuate the valve B in one direction and to connect the conduit f to pressure and the conduit g to drain to actuate the valve B in the opposite direction.

As shown in Figs. 2 and 3, the valve A has a casing indicated generally by the numeral 1 that comprises a body portion 2 that has a longitudinal bore from one end to the other thereof that provides a valve chamber that is closed at the ends by end closure members 4 and 5 and that receives a sliding piston type valve member 6. The valve member 6 has axially spaced enlarged piston portions 7 and 8 that have a sliding fit in the valve chamber 3. The valve chamber 3 is provided with a circumferential recess 9 that is centrally disposed with respect to two circumferential recesses 10 and 11 that are axially spaced from the recess 9 at opposite sides thereof. A pressure inlet port 12 connects the recess 9 with the pressure line C, outlet ports 13 and 14 connect the recesses 10 and 11 with the service conduits f and g and a drain port 15 connects both ends of the valve chamber to drain, the valve casing 1 being provided with a passage 15a which connects both ends of the valve chamber 3 with the port 15 so that pressure on the end closures tending to cause leakage is prevented. In the intermediate or neutral position of the valve member 6, the enlarged portions 7 and 8 thereof normally engage the cylindrical wall of the chamber 3 between the central recess 9 and the recesses 13 and 14 so that both of the service lines f and g are disconnected from the pressure line D. Movement of the valve members 6 in one direction connects the outlet port 13 to pressure and movement of the valve member in the opposite direction connects the outlet port 14 to pressure. The ports 13 and 14 are both connected to drain in the intermediate position of the valve member 6, the valve member 6 being movable in one direction to move the piston portion 7 across the recess 10 to a position where the valve connects the recess 10 to pressure and cuts off its connection to drain, and in the opposite direction to move the piston portion 8 across the recess 11 to connect it to pressure and cut off its connection to drain. The valve member 6 has extensions 16 and 17 that slidably fit in the end closures 4 and 5. The extension 16 extends through the end closure 4 which is provided with a cylindrical bore 18 in which the extension 16 fits. The closure 4 is detachably secured by suitable means to the valve body 2 and is provided with a positioning projection 19 that fits in the bore of the chamber 3. The valve member 6 is actuated by means of a lever 20 that is pivoted above its lower end to a bracket 21 which may be formed integrally with the closure member 4, the lower end of the lever being connected to the extension 16 to impart sliding movements to the valve 6. In the intermediate or neutral position of the valve 6 the lever 20 is in vertical position so that by moving the lever 20 in one direction from its vertical position, pressure is supplied to the service conduit f, and by moving it in the opposite direction pressure is supplied to the service conduit g. A sealing ring 22 may be provided in the closure member 4 to prevent leakage of fluid through the bore 18.

The end closure 5 has inner, intermediate and outer parts 23, 24 and 25. The inner part 23 has a cylindrical projection 26 that fits in a bore of the chamber 3 and an outer cylindrical projection 27 that fits in an axial bore 28 in the intermediate member 24. The intermediate member 24 has a counterbore 29 opening to its outer end which is of slightly greater diameter than the bore 28. At the inner end of the counterbore 29 an internal circumferential recess 30 is provided that opens to a passage 31 in the valve casing that connects the recess 30 with the passage 15a and drain port 15. The outer part 25 of the closure member 5 has a cylindrical projection 32 that fits in the counterbore 29 and that extends into the circumferential recess 30. The member 25 has an axial bore 33 opening at its inner end and terminating short of the outer face of the member 25 and a counterbore 34 at the inner end of its projection 32. In order to connect the counterbore 34 at all times to drain, slots 35 are provided in the portion of the projection 32 that is positioned within the circumferential recess 30. The bore 28 serves as a fluid pressure cylinder and receives a sleeve piston 36 that has a sliding fit on the extension 17 of the valve member 6. The sleeve piston 36 is engageable with an enlargement 37 on the outer end of the extension 17 to impart a movement to the valve. The enlargement 37 is of a diameter less than that of the counterbore 34 so that it may be moved into the counterbore 34, and the sleeve piston 36 is engageable with the inner end of the extension 32 of the outer closure part 25, which serves to limit the movement of the piston 36. A piston 38 slidably fits in the bore 33 and has an enlarged end 39 at its inner end that engages with the outer end of the extension 17.

A passage 40 in the valve casing 1 connects the circumferential recess 9, which is open at all times to the pressure line C, with the bore 28 inwardly of the sleeve piston 36 and with the outer end of the bore 33, so that the piston 36 is subjected at all times to line pressure pressing it against the enlargement 37 and the piston 38 is subjected at all times to line pressure pressing it inwardly toward the piston 36. The pressure face area of the sleeve piston 36 is greater than the pressure face area of the piston 38 so that the piston 36 is normally held in engagement with the inner end of the projection 32. Pressure acting on the piston 38 holds the enlargement 37 in engagement with the outer end of the piston 36 and, when the piston 36 is in engagement with the inner end of the projection 32, the valve member is held in its intermediate or neutral position with the lever 20 vertical, as shown in Fig. 2 of the drawings.

When the lever 20 is moved to the left from the position shown in Fig. 2, the valve member 6 is moved in the opposite direction, moving the enlargement 37 away from the piston 36 and into the counterbore 34, as shown in Fig. 3 of the drawings. When the lever 20 is released the line pressure acting on the piston 38 forces the valve 6 to the left until the enlargement 37 is in engagement with the piston 36, returning the valve to its intermediate or neutral position and the lever 20 to its vertical position. Movement of the lever 20 to the right from the position shown in Fig. 2 moves the enlargement 37 and piston 36 inwardly in the bore 28, shifting the valve 6 to a position connecting the outlet port 13 to pressure. Upon release of the lever 20, fluid pressure acting on the piston 36 returns the valve to neutral position where the piston 36 engages the inner end of the projection 32. Movement of the actuating lever in either direction is opposed by the line pressure acting upon one of the pistons 36 or 38 which offers a resistance to movement of the valve which is proportional to the pressure existing in the pressure line C.

In the event of an undesirable or dangerous increase or decrease in pressure in the line C, the feel of the lever 20 would direct the operator's attention to the fact and enable him to quickly take steps to remedy the situation. By employing centering pistons of different pressure face area, the centering of the valve can be effected by means of a single stop in the path of the piston of greater pressure face area. By employing a sleeve type piston for one of the centering pistons, a simple and compact construction is provided for pressure centering a valve of the sliding piston type which has a part extending through an end of the valve casing for connection to an external actuating means.

In Fig. 4 of the drawings, a control valve of slightly modified form is shown. This valve has a casing 41 provided with a body portion 42 having a longitudinal bore that provides a valve chamber 43 that is closed by end closures 44 and 45. Within the valve chamber there is mounted a piston type valve member 46 which has axially spaced enlarged piston portions 47 and 48 that have a sliding fit in the bore of the chamber 43. A circumferential recess 49 is provided in the valve chamber 43 which is centrally disposed with respect to similar circumferential recesses 50 and 51 axially spaced therefrom. The recess 49 communicates with a pressure inlet port 52 and the recesses 50 and 51 communicate with ports 53 and 54 which deliver to service conduits. A drain port 55 is provided adjacent one end of the valve chamber 3 and a passage 55a extending longitudinally through the valve member maintains communication between the ends of the valve chamber which are connected at all times to drain. As so far described, the valve of Fig. 4 is essentially the same as the valve shown in Figs. 2 and 3.

The end closure plate 44 has inner and outer parts 56 and 57, the outer part 57 has a central bore 58 in which an extension 59 of the valve member 46 has a sliding fit. The inner part 56 of the end closure 44 has a bore 60 of larger diameter than the bore 58 in the outer part 57, the bore 60 serving as a fluid pressure cylinder and having mounted therein a sleeve piston 61 that has a sliding fit on the extension 59 of the valve member. The inner end of the piston 61 extends into the valve chamber 43 which is provided with a counterbore 62 to receive the inner end of the piston 61. The sleeve piston 61 is engageable with a ring 63 that is slidable on the extension 59 and that is engageable with the body of the valve member 46 and with a shoulder 64 at the inner end of the counterbore 62. Fluid pressure acting upon the outer end of the sleeve piston 61 normally holds the ring 63 in engagement with the shoulder 64. A sealing ring 65 carried by the extension 59 engages the sleeve piston 61 interiorly and a sealing ring 66 carried by the inner closure part 56 engages the piston 61 exteriorly to prevent leakage of fluid through the part 56, and a sealing ring 67 is provided in the outer closure part 57 to prevent leakage through the bore 58.

The closure 45 is provided with an inner part 68 and an outer part 69 and the inner part 68 is provided with a central bore 70 that is axially alined with the chamber 43, the outer end of the bore 70 being closed by the outer part 69 of the closure member. A piston 71 in the bore 70 projects into the valve chamber 43 for engagement with the valve member 46. A passage 72 in the valve casing connects the pressure inlet 52 at all times to the outer ends of the bores 60 and 70 which serve as pressure cylinders for the pistons 61 and 71, so that the pistons 61 and 71 apply opposing axial thrusts to the sliding valve member 46.

The opposite ends of the valve chamber 43 into which the pistons 61 and 71 project are connected at all times to the drain port 55. The pressure face area of the piston 61 is slightly greater than the pressure face area of the piston 71, so that the piston 61 is normally held in its innermost position where it holds the ring 63 against the shoulder 64. Pressure acting on the piston 71 presses the valve member 46 against the ring 63 to hold the valve member 46 in its intermediate or neutral position as shown in Fig. 4.

The extension 59 of the valve member is pivotally connected to the lower end of a lever 74 which is pivoted to a bracket 75 carried by the valve casing. When the valve is in its neutral position the lever 74 is in a vertical position. When the lever 74 is moved to the left from its vertical position, the valve member 46 is moved toward the piston 71 against the pressure acting on the piston 71 while the piston 61 and ring 63 are retained in the position shown in Fig. 4. Movement of the valve member in this direction connects the pressure inlet port 52 with the service port 54, while the port 53 remains in communication with the drain outlet 55. Upon release of the lever 74, pressure acting on the piston 71 returns the valve 46 to its neutral position. Upon movement of the lever 74 to the right from the position shown in the drawing, the valve member 46 is moved to the left, moving the sleeve piston 61 and the ring 63 outwardly against the pressure acting on the piston 61. Upon release of the lever, the fluid pressure acting on the greater pressure face area of the piston 61 will return the valve member 46 to its intermediate or neutral position against the pressure acting upon the smaller pressure face of the piston 71.

It is to be understood that in accordance with the provisions of the patent statutes, variations and modifications of the specific devices herein shown and described may be made without departing from the spirit of the invention.

What I claim is:

1. A control valve for selectively connecting either of two service conduits to a fluid pressure line comprising a valve casing having a body portion provided with a bore extending from end to end and end members closing the ends of said bore to provide a valve chamber, said chamber having an inlet port to said pressure line and an outlet port to each of said service conduits, a piston type valve member slidable in said chamber in either direction from an intermediate neutral position to connect either of said outlet ports to said inlet port, means connecting both ends of said valve chamber at all times to drain, two valve centering cylinders, each in one of said end closure members and each axially alined with said valve member, an extension of said valve member extending into one of said cylinders, a sleeve piston in the latter cylinder slidably fitting therein and on said extension, a piston in the other of said cylinders engageable with said valve member, one of said pistons having a pressure face area greater than the other, means connecting said cylinders at all times to said pressure line to apply thrusts in opposite directions to said pistons, means forming a circumferential shoulder on said valve member against which said sleeve piston is pressed, a stop in the path of the piston of greater pressure face area positioned to limit the valve actuating stroke thereof at a point where said valve member has reached its neutral position, and means for applying an axial thrust to said valve member to move it in either direction from the neutral position in which it is normally held by said centering piston.

2. A control valve as set forth in claim 1 in which the two valve centering cylinders are in one of the end closure members of the valve casing.

3. A control valve as set forth in claim 1 in which one of the valve centering cylinders is in each of the end closure members of the valve casing.

4. A control valve comprising a casing having a valve chamber, a valve member movable in said chamber in either direction from an intermediate position, means for applying an actuating force to said valve member to move it in either direction from its intermediate position, two valve centering cylinders in said casing, means for continuously supplying fluid at the same pressure to both cylinders, a valve returning piston in each of said cylinders that has a pressure face subjected to the pressure of said fluid and that exerts a thrust on said valve member, the piston of one cylinder exerting a thrust on said valve member in a direction opposite that exerted by the piston of the other cylinder, one of said pistons having a pressure face area greater than the other, and means for limiting the movement of the latter piston in the direction in which it is moved by fluid pressure at a point where said valve is in its intermediate position, so that said valve member is relieved of the thrust of said piston of larger pressure face area when moved from its intermediate position against the thrust of the piston of smaller pressure face area.

References Cited in the file of this patent

UNITED STATES PATENTS

| | | |
|---|---|---|
| 1,787,328 | Schottler | Dec. 30, 1930 |
| 2,614,539 | Ernst | Oct. 21, 1952 |
| 2,615,433 | Deardorff et al. | Oct. 28, 1952 |
| 2,826,178 | Krapf | Mar. 11, 1958 |

FOREIGN PATENTS

| | | |
|---|---|---|
| 527,171 | Great Britain | Oct. 3, 1940 |